UNITED STATES PATENT OFFICE.

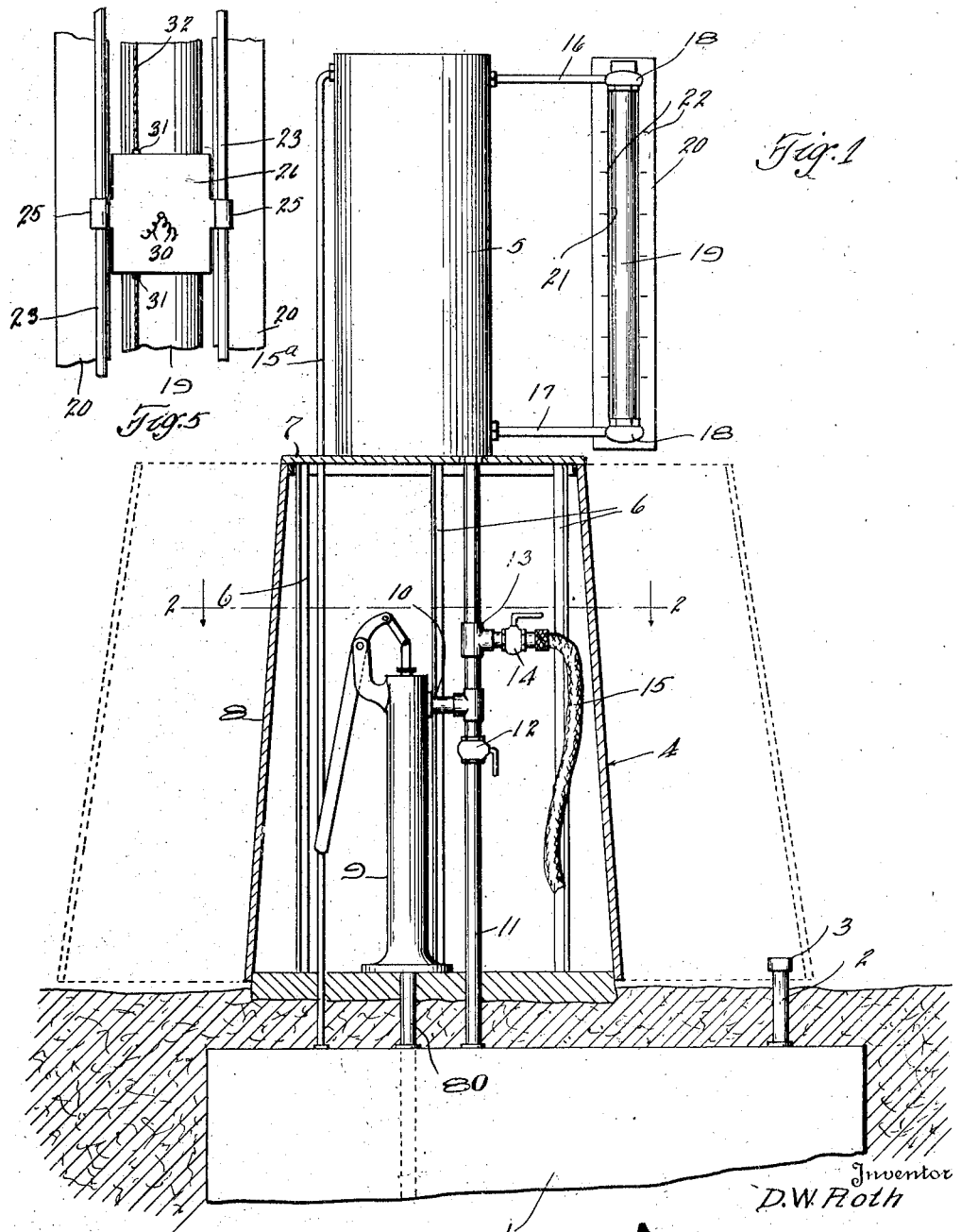

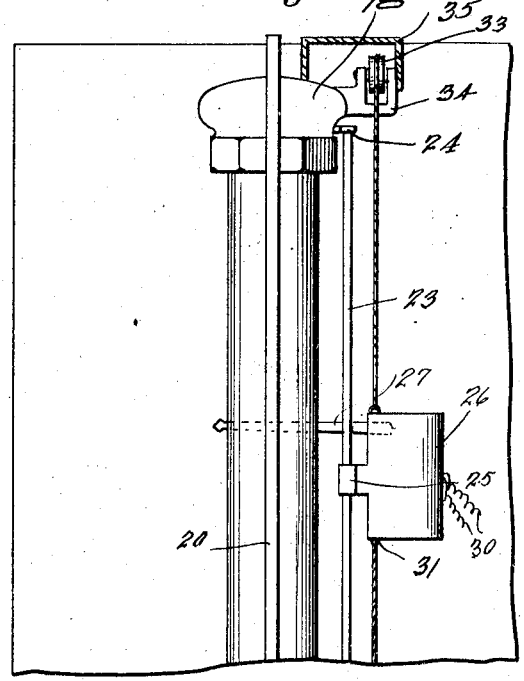
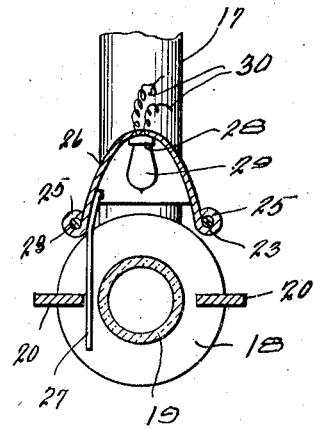
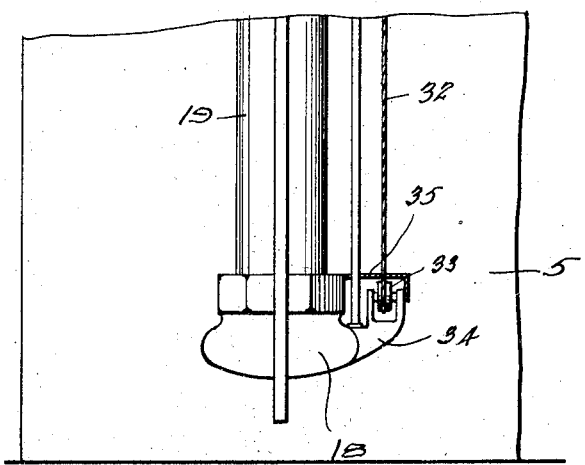
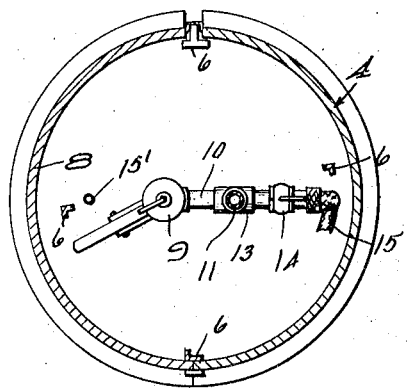

DANIEL W. ROTH, OF SHELBY, MICHIGAN.

DISPENSING DEVICE.

1,355,697.     Specification of Letters Patent.     Patented Oct. 12, 1920.

Application filed December 20, 1916. Serial No. 137,984.

*To all whom it may concern:*

Be it known that I, DANIEL W. ROTH, a citizen of the United States, residing at Shelby, in the county of Oceana and State of Michigan, have invented certain new and useful Improvements in Dispensing Devices; and I do hereby declare the following to be a full, clear, and exact description of the invention, such as will enable others skilled in the art to which it appertains to make and use the same.

This invention relates to new and useful improvements in dispensing devices for gasolene and similar liquids which are ordinarily used by motor vehicles and at gasolene stations.

Another object of the invention resides in the provision of a dispensing device which will accurately indicate the amount of liquid passing through the dispensing nozzle.

A further object of the invention is to provide a device having a vertically slidable reflector mounted thereon by which the height of the liquid within the dispensing tank may be readily determined.

A further object of the invention is to provide a pump for pumping the liquid from a storage tank into the dispensing tank.

Still another object of the invention is to provide a hollow support for the dispensing tank which support houses the pump and the various valves and is provided with doors by which access is had to the interior.

With these and other objects in view the invention consists in the novel combination and arrangement of parts which will be fully set forth in the following specification and accompanying drawings, in which:—

Figure 1 is a side view partly in section of a dispensing apparatus constructed in accordance with this invention.

Fig. 2 is a horizontal sectional view on line 2—2 of Fig. 1.

Fig. 3 is an enlarged detail view of the gage.

Fig. 4 is a horizontal sectional view through the gage, and

Fig. 5 is an enlarged fragmentary view of a portion of the gage looking at the same from the rear side.

Referring to the drawings 1 designates the storage tank of the device which is preferably embedded beneath the surface of the ground and is provided with the filling spout 2 which extends upwardly through the ground and is provided with a cap 3 which is exposed as shown in the drawings. A suitable support designated generally by the numeral 4 is provided for the dispensing tank 5 and this support comprises a plurality of standards 6 which are connected at their upper ends to a suitable platform 7 on which the tank 5 is supported. Hingedly connected to the standards are suitable doors 8 which in the embodiment of the invention shown in the drawing constitute two substantially semi-circular vertically pivoted sections, being adapted to swing outwardly as shown somewhat diagrammatically in Fig. 2 and which doors when closed form a casing for housing the pump, standards and piping. Connected into the tank 1 and preferably extending within a short distance of the bottom of the same is a pipe 80 which leads to the pump 9 which may be of any preferred construction and which is connected by means of a nipple 10 to the vertical pipe 11, the lower end of which is connected to the tank 1 while the upper end is connected to the bottom of the tank 5. A suitable valve 12 is arranged in the pipe 11 below the nipple 10 and connected to the pipe 11 between the nipple 10 and the tank 5 is a suitable T-connection 13 having a control valve 14 connected thereto by means of which the flow of liquid into the flexible tube or hose 15 is controlled. This hose 15 is connected to the valve 14 and is adapted to be placed in the filling nozzle of the tank of the vehicle when said tank is being filled. Connected to the upper end of the tank 5 is an overflow pipe 15ª the lower end of which is connected to the tank 1 and it will thus be seen that as the liquid is pumped up into the tank 5, the said tank becomes filled and any overflow of liquid will be cared for through the pipe 15ª.

Extending outwardly from the upper and lower ends of the tank 5 are suitable horizontal pipes 16 and 17 which are provided at their outer ends with suitable heads 18 into which the upper and lower ends of the gage tube 19 are extended. This gage tube 19 is held in the heads in any preferred manner and is formed of glass or a similar transparent material so that as the tank 5 is filled and the liquid level rises therein the liquid will flow into the gage tube 19 and thus indicate the height of liquid within the tank 5.

Secured to the heads 18 and extending on opposite sides of the gage tube is a gage plate 20 which is provided with a longitudinal slot 21 into which the gage glass 19 fits. This gage plate is provided with a plurality of graduations 22 which are spaced on said plate to indicate gallons and fractions thereof, so that as the liquid is pumped into the tank 5 and it rises to the uppermost mark 22, it will when the valve 14 is opened begin to fall and as the lines of each successive mark below the uppermost gage mark will indicate the number of gallons or fractions of a gallon drawn from the tank 5.

In order to indicate the original height of the liquid within the tube a pair of guide bars 23 are attached at their upper and lower ends as to suitable brackets 24 carried by the heads 18 and these brackets form guides on which the guide sleeves 25 of the reflector 26 are slidably mounted. This reflector has extending forwardly therefrom an indicating hand 27 and carries a lamp socket 28 into which an electric bulb 29 is secured and this socket 28 is connected by suitable wires 30 to a power source so that the device may be illuminated at night. The hand 27 projects forwardly from the reflector and through the slot 21 between one wall thereof and the gage glass and it will be understood that before drawing off the liquid within the tank 5 the hand is moved upwardly until it corresponds to the liquid level whereupon the valve 14 may be opened and the liquid allowed to run out through the flexible pipe 15 until the desired quantity has been drawn from the tank 5 and thus the measurement of the liquid drawn off is gaged from the gage pin or hand 27 to the liquid level. In order to provide a means for moving the reflector and gage hand or pin vertically eyes 31 are attached to the upper and lower edge of the reflector and have connected thereto the ends of a flexible member 32 which run over suitable rollers or pulleys 33 mounted in brackets 34 attached to the heads 18. Suitable hoods 35 are attached to the brackets for housing the pulleys 33 in order to protect the same from the elements.

It will be apparent from the foregoing that in use the tank 5 is first filled whereupon the valve 14 may be opened and the liquid drawn off through the pipe 15 and it will be seen that the fall of liquid within the tank 5 will be registered in the gage 19 thus accurately showing the amount of liquid which has been drawn through the pipe 15. Should it be desired to drain the tank 5 it will be seen that the valve 14 is closed and the valve 12 opened thus the liquid contained within the tank 5 may be drained back into the tank 1. In order that the whole device may be closed and rendered inoperative so as to prevent theft of the liquid the doors 8, the open position of which is indicated in dotted lines in Fig. 1 of the drawing, are closed and it will be understood that any suitable locking means may be provided therefor.

While in the foregoing there has been shown and described the preferred embodiment of this invention, it is to be understood that such changes may be made in the combination and arrangement of parts as will fall within the spirit and scope of the invention as claimed.

What is claimed is:—

1. In a device of the class described, the combination with a gage and illuminating means for said gage slidable parallel thereto, of a projecting indicator on said illuminating means and movable along said gage.

2. In a device of the class described, the combination with a gage and illuminating means for said gage slidable parallel thereto, of a slotted gage plate having a slot of larger width than the diameter of said gage and a transversely arranged pointing rod connected to said illuminating means and projecting through said slot in proximity with said gage pipe.

3. In a device of the class described, the combination with a gage of vertically slidable illuminating and light reflecting means, a stationary gage plate, a transversely arranged pointing rod connected to said illuminating and reflecting means and projecting in operative relation to said gage plate and said gage and a flexible vertically movable member connected to said illuminating and reflecting means for adjusting the position of the illuminating and reflecting means longitudinally of the gage and gage plate.

4. In a device of the class described, the combination with a gage of vertically slidable illuminating and light reflecting means, a gage plate, a transversely arranged pointing rod connected to said illuminating and reflecting means and projecting between said gage plate and said gage, an endless rope to which said illuminating and reflecting means are secured, guide rollers for said rope, and protecting hoods for said rollers.

In testimony whereof I affix my signature in presence of two witnesses.

DANIEL W. ROTH.

Witnesses:
SAMUEL ODELL,
GEORGE A. KANTZ.